United States Patent
Hsieh

(10) Patent No.: US 10,604,640 B2
(45) Date of Patent: Mar. 31, 2020

(54) RESIN COMPOSITION AND ARTICLES MADE THEREFROM

(71) Applicant: Elite Material Co., Ltd., Taoyuan (TW)

(72) Inventor: Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 89 days.

(21) Appl. No.: 15/803,433

(22) Filed: Nov. 3, 2017

(65) Prior Publication Data

US 2019/0016874 A1     Jan. 17, 2019

(30) Foreign Application Priority Data

Jul. 17, 2017 (TW) .............................. 106123729 A

(51) Int. Cl.
| | | |
|---|---|---|
| *C08K 5/529* | (2006.01) | |
| *C08L 79/08* | (2006.01) | |
| *C08L 75/14* | (2006.01) | |
| *C08K 5/00* | (2006.01) | |
| *C08K 5/5313* | (2006.01) | |
| *C08K 5/3415* | (2006.01) | |

(52) U.S. Cl.
CPC ............ *C08K 5/529* (2013.01); *C08K 5/3415* (2013.01); *C08K 5/5313* (2013.01); *C08L 75/14* (2013.01); *C08L 79/08* (2013.01); *C08L 79/085* (2013.01); *C08K 5/0066* (2013.01); *C08L 2201/02* (2013.01); *C08L 2205/05* (2013.01)

(58) Field of Classification Search
None
See application file for complete search history.

(56) References Cited

U.S. PATENT DOCUMENTS

| | | | |
|---|---|---|---|
| 2014/0349090 A1* | 11/2014 | Hsieh ...................... | C08L 71/12 428/209 |
| 2015/0166788 A1* | 6/2015 | Li ........................... | C08L 71/00 524/508 |
| 2017/0022228 A1* | 1/2017 | Hu ..................... | C07F 9/657172 |
| 2017/0166729 A1* | 6/2017 | Hu ........................... | C09D 7/61 |
| 2017/0260364 A1* | 9/2017 | Hsieh ....................... | C08K 5/53 |
| 2018/0086870 A1* | 3/2018 | Hsieh ................... | C08G 79/025 |
| 2019/0077914 A1* | 3/2019 | Hsieh ........................ | C08J 5/24 |

FOREIGN PATENT DOCUMENTS

| | | |
|---|---|---|
| TW | 200508284 | 3/2005 |
| TW | 201720861 A | 6/2017 |

* cited by examiner

*Primary Examiner* — Joseph D Anthony
(74) *Attorney, Agent, or Firm* — Muncy, Geissler, Olds & Lowe, P.C.

(57) ABSTRACT

Disclosed is a resin composition which comprises a compound with at least two DOPO groups or a combination thereof as the flame retardant and an aliphatic long-chain maleimide compound. The resin composition is useful for the preparation of various articles, such as a prepreg, a resin film, a resin film with copper foil, a laminate or a printed circuit board, achieving at least one, more or all properties improved of laminate formability, reliability of multiple laminations, chemical resistance, thermal resistance, dielectric constant, dissipation factor, interlayer bonding strength, storage modulus and so on.

12 Claims, No Drawings

RESIN COMPOSITION AND ARTICLES MADE THEREFROM

CROSS-REFERENCE TO RELATED APPLICATION

This application claims the priority benefits of Taiwan Patent Application No. 106123729, filed on Jul. 17, 2017. The entirety the above-mentioned patent application is hereby incorporated by reference herein and made a part of this specification.

BACKGROUND

1. Field of the Disclosure

The present disclosure relates to a resin composition and more particularly to a resin composition useful for preparing an article such as a prepreg, a resin film, a resin film with copper foil, a laminate or a printed circuit board.

2. Description of Related Art

With the rapid advancement of electronic technology, information processing in mobile communication, servers, cloud storage and other electronic products has been incessantly directed toward high frequency signal transmission and high speed digitalization, and low dielectric resin material has become the mainstream for the development of laminates for high speed data transmission in order to satisfy the demands of high speed information transmission. Therefore, there is a need for developing materials suitable for a high performance printed circuit board.

Conventionally, maleimide has been used as an ingredient of high performance printed circuit board materials, but maleimide fails to achieve desirable electric properties; in addition, the use of maleimide as the main resin component leads to poor laminate formability, and in view of preventing environmental pollution, halogen-free materials are generally used as the flame retardants, which have the problems of poor thermal resistance.

SUMMARY

To solve the problems in prior arts and particularly to address the issues that conventional materials fail to achieve desirable one or more properties, such as laminate formability, reliability of multiple laminations, chemical resistance, thermal resistance and dielectric properties, this disclosure provides a resin composition, comprising a flame retardant and an aliphatic long-chain maleimide compound, wherein the flame retardant comprises a compound with at least two DOPO groups, as shown by Formula (I) to Formula (III) below, or a combination thereof:

Formula (I)

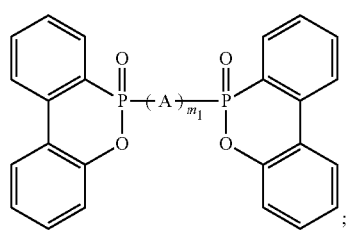

Formula (II)

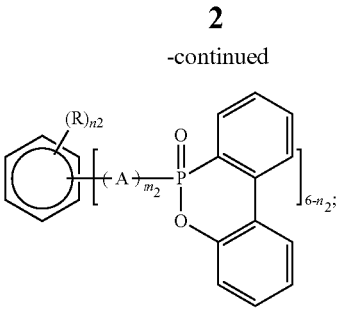

Formula (III)

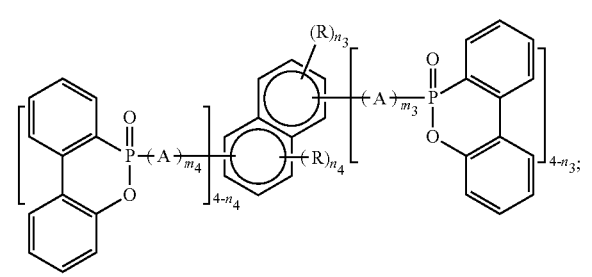

in Formula (I), A represents a $C_1$ to $C_{10}$ straight chain or branched chain alkylene, and m1 is an integer of 1 to 12;
in Formula (II), A represents a $C_1$ to $C_{10}$ straight chain or branched chain alkylene, m2 is an integer of 1 to 6, R represents hydrogen or a $C_1$ to $C_6$ hydrocarbyl, and n2 is an integer of 0 to 4;
in Formula (III), A individually represents a $C_1$ to $C_{10}$ straight chain or branched chain alkylene, m3 and m4 are each an integer of 1 to 6, R individually represents hydrogen or a $C_1$ to $C_6$ hydrocarbyl, n3 and n4 are each an integer of 0 to 4, and $0 \leq n3+n4 \leq 6$; and
wherein the aliphatic long-chain maleimide compound has at least one maleimide group bonded with a substituted or unsubstituted $C_5$ to $C_{50}$ aliphatic group.

In various embodiments, the flame retardant may comprise a structure represented by Formula (IV) or Formula (V), or a combination thereof:

Formula (IV)

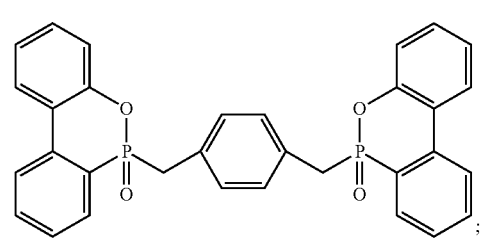

Formula (V)

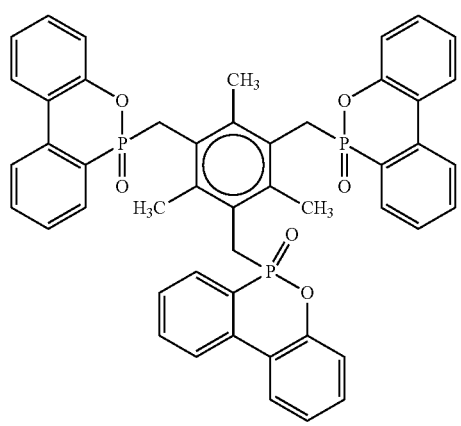

Unless otherwise specified, various aliphatic long-chain maleimide compounds may all be used in the resin compositions of different embodiments. For example, the aliphatic long-chain maleimide compound may comprise a structure represented by Formula (VI) or Formula (VII), or a combination thereof:

Formula (VI)

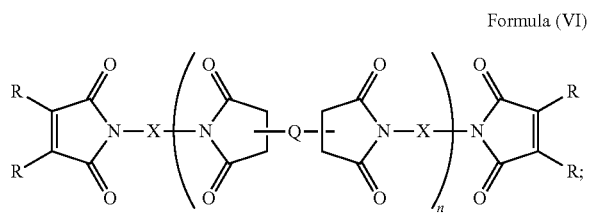

Formula (VII)

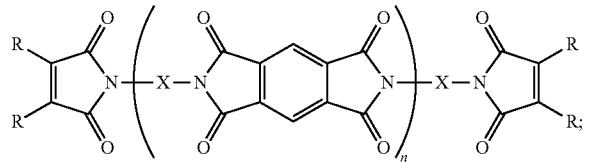

wherein X individually represents a substituted or unsubstituted aliphatic group, n is an integer of 1 to 10, Q represents a substituted or unsubstituted aliphatic group, aromatic group, heteroaromatic group, or siloxane group, and R individually represents hydrogen or a $C_1$ to $C_6$ hydrocarbyl.

For example, the aliphatic long-chain maleimide compound may comprise a structure represented by Formula (VIII) or Formula (IX), or a combination thereof:

In one preferred embodiment, the flame retardant may comprise a structure represented by Formula (IV) or Formula (V) or a combination thereof, in an amount of 50 to 70 parts by weight; the aliphatic long-chain maleimide compound may comprise a structure represented by Formula (VIII) or Formula (IX) or a combination thereof, in an amount of 60 to 100 parts by weight.

In addition to the aforesaid two components, in various embodiments, the resin composition may optionally further comprise a vinyl compound, epoxy resin, cyanate ester resin, phenolic resin, benzoxazine resin, styrene maleic anhydride resin, polyester, amine curing agent, polyamide, polyimide or a combination thereof.

In one embodiment, the resin composition may further comprise 5 to 55 parts by weight of a vinyl compound, preferably 10 to 40 parts by weight.

In one embodiment, the resin composition may further comprise 5 to 15 parts by weight of a triallyl isocyanurate prepolymer, preferably 10 to 15 parts by weight.

In one embodiment, the resin composition may further comprise 20 to 40 parts by weight of a vinyl benzyl maleimide resin, preferably 30 to 40 parts by weight.

In another aspect, the present disclosure provides an article made from the resin compositions of various embodiments, which may be or comprise a prepreg (i.e., PP), a resin film, a resin film with copper foil, a laminate or a printed circuit board.

In one embodiment, the resin compositions of various embodiments may be coated on a polyester (PET) film or a polyimide (PI) film, followed by baking and heating to the semi-cured state (B-Staged) to obtain the resin film.

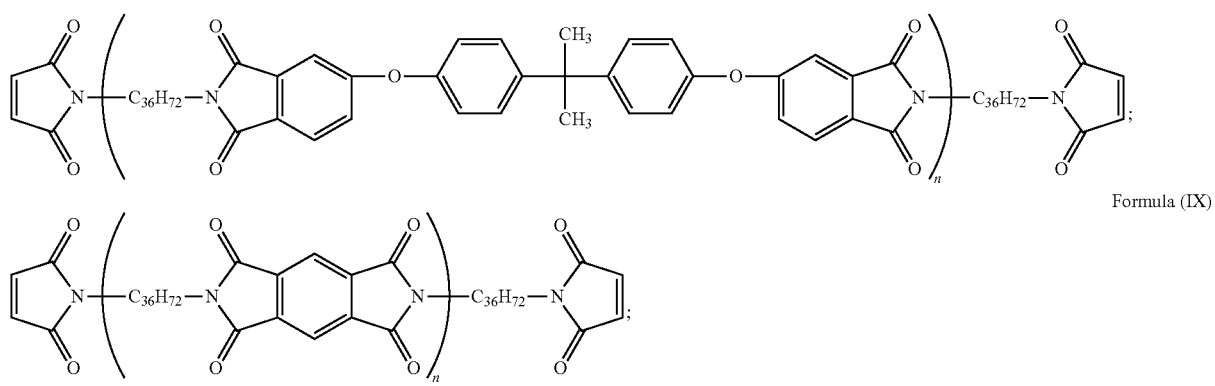

Formula (VIII)

Formula (IX)

wherein n is an integer of 1 to 10.

Unless otherwise specified, the amount or ratio of the flame retardant and the aliphatic long-chain maleimide compound may be adjusted according to different needs.

In one embodiment, disclosed herein is a resin composition comprising 30 to 80 parts by weight of any one of the aforesaid flame retardants and 60 to 100 parts by weight of any one of the aforesaid aliphatic long-chain maleimide compounds.

In one embodiment, the amount of the flame retardant may be 40 to 80 parts by weight, such as 50 to 70 parts by weight; in one embodiment, the amount of the aliphatic long-chain maleimide compound may be 60 to 100 parts by weight.

In one embodiment, the resin compositions of various embodiments may be coated on a copper foil, followed by baking and heating to the semi-cured state to obtain the resin coated copper (RCC).

In one embodiment, the resin compositions of various embodiments may be used to make a prepreg, which has an reinforcement material and a layered structure (insulation layer) formed thereon, wherein the layered structure is made by heating the resin compositions to a semi-cured state (B-stage) at a high temperature for example between 120° C. and 140° C. For example, the reinforcement material may be any one of a fiber material, woven fabric, non-woven fabric, liquid crystal resin film, polyester (PET) film and polyimide (PI) film, and the woven fabric preferably comprises fiberglass fabrics. Types of fiberglass fabrics are not particularly limited and may be any commercial fiberglass fabric useful for various printed circuit boards, such as E-glass fabric, D-glass fabric, S-glass fabric, T-glass fabric, L-glass fabric or NE-glass fabric, wherein the fiber may comprise yarns and rovings, in spread form or standard form. Non-woven fabric preferably comprises liquid crystal resin non-woven fabric, such as polyester non-woven fabric, polyurethane non-woven fabric and so on, but not limited thereto. Woven fabric may also comprise liquid crystal resin woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

In one embodiment, resin compositions of various embodiments of the present disclosure may be made into a laminate, such as a copper-clad laminate, which comprises two copper foils and an insulation layer disposed between the copper foils, wherein the insulation layer is made by curing the resin composition at high temperature and high pressure, a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. In one preferred embodiment, the laminate is a copper-clad laminate.

In one embodiment, the laminate may be further processed to provide a printed circuit board.

In one embodiment, the article made by 5 lamination processes is capable of sustaining 20 times of reflow test by reference to IPC-TM-650 2.6.27 without delamination.

In one embodiment, the article is capable of preventing weave exposure after 5-minute immersion in a NaOH solution.

In one embodiment, the article has a storage modulus of between 6000 MPa and 9500 MPa as measured by reference to IPC-TM-650 2.4.24.4.

In one embodiment, the article comprises outer insulation layers and a plurality of inner insulation layers between the outer insulation layers, wherein the plurality of inner insulation layers have an interlayer bonding strength of between 2.9 lb/in and 4.0 lb/in as measured by reference to IPC-TM-650 2.4.8.

In one embodiment, the article further comprises at least one of the following properties:
a T288 thermal resistance as measured by reference to IPC-TM-650 2.4.24.1 of greater than or equal to 70 minutes;
a soldering resistance as measured by reference to IPC-TM-650 2.4.23 of greater than or equal to 20 times;
a thermal resistance after moisture absorption as measured by reference to IPC-TM-650 2.6.16.1 and IPC-TM-650 2.4.23 of greater than or equal to 3 hours;
a dielectric constant at 10 GHz as measured by reference to JIS C2565 of less than or equal to 3.3; and
a dissipation factor at 10 GHz as measured by reference to MS C2565 of less than or equal to 0.0035.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Resin Composition

A primary object of the present disclosure is to provide a resin composition, mainly comprising a flame retardant and an aliphatic long-chain maleimide compound.

In various embodiments, the amount or ratio of the flame retardant and the aliphatic long-chain maleimide compound may be adjusted according to different needs. For example, in one embodiment, the resin composition comprises 30 to 80 parts by weight of the flame retardant, such as 40 to 70 parts by weight, 50 to 70 parts by weight or 55 to 65 parts by weight; and 60 to 100 parts by weight of the aliphatic long-chain maleimide compound.

In various embodiments, the flame retardant may comprises a compound with at least two DOPO groups, as shown by Formula (I) to Formula (III), or a combination thereof:

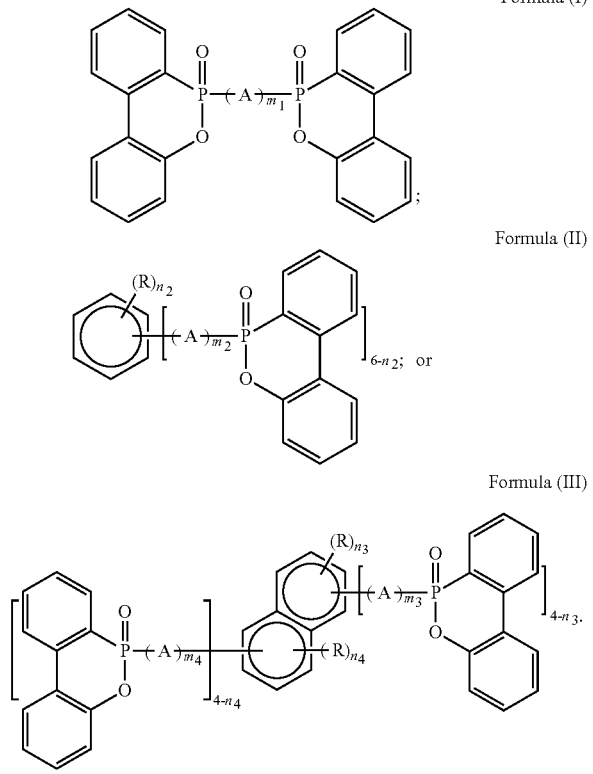

In Formula (I), A represents a $C_1$ to $C_{10}$ straight chain or branched chain alkylene, and m1 is an integer of 1 to 12. For example, A may be a methylene, ethylene, propylene or the like, and m1 may be an integer of 1 to 6 or 1 to 3.

In Formula (II), A represents a $C_1$ to $C_{10}$ straight chain or branched chain alkylene, m2 is an integer of 1 to 6, R represents hydrogen or a $C_1$ to $C_6$ hydrocarbyl, and n2 is an integer of 0 to 4. For example, A may be a methylene, ethylene, propylene or the like, m2 may be an integer of 1 to 3, R may be hydrogen, methyl, ethyl, propyl or the like, and n2 may be 0, 1, 2, 3 or 4.

In Formula (III), A individually represents a $C_1$ to $C_{10}$ straight chain or branched chain alkylene, such as methylene, ethylene, propylene or the like; m3 and m4 are each an integer of 1 to 6, such as an integer of 1 to 3; R individually represents hydrogen or a $C_1$ to $C_6$ hydrocarbyl, such as hydrogen, methyl, ethyl, propyl or the like; n3 and n4 are each an integer of 0 to 4, and $0 \leq n3+n4 \leq 6$.

In one preferred embodiment, the flame retardant may comprise a structure represented by Formula (IV) or Formula (V), or a combination thereof:

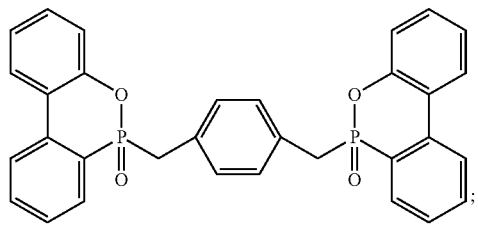

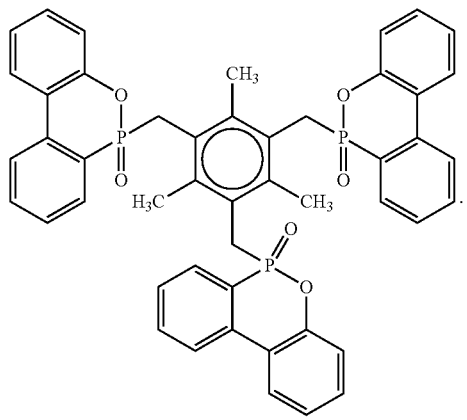

In addition, the resin composition of the present disclosure may also comprise other flame retardants, such as a phosphorous-containing compound, which may be at least one of the following compounds, but not limited thereto: bisphenol diphenyl phosphate, ammonium polyphosphate, hydroquinone bis-(diphenyl phosphate), bisphenol A bis-(diphenylphosphate), tri(2-carboxyethyl) phosphine (TCEP), tri(chloroisopropyl) phosphate, trimethyl phosphate (TMP), dimethyl methyl phosphonate (DMMP), resorcinol bis(dixylenyl phosphate) (RDXP, such as PX-200, commercially available from Daihachi Chemical Industry Co. Ltd.), phosphazene (such as SPB-100, commercially available from Otsuka Chemical Co. Ltd.), m-phenylene methylphosphonate (PMP), melamine polyphosphate, 9,10-dihydro-9-oxa-10-phosphaphenanthrene-10-oxide (DOPO), DOPO derivatives with at least two DOPO groups, DOPO-containing phenolic resin (e.g. DOPO-HQ, DOPO-PN, and DOPO-BPN), DOPO-containing epoxy resin, DOPO-HQ-containing epoxy resin, and so on, wherein DOPO-BPN may be bisphenol novolac compounds such as DOPO-BPAN (e.g., XZ92741, commercially available from the Dow Chemical Company), DOPO-BPFN, and DOPO-BPSN, diphenyl phosphine oxide (DPPO) compound, diphenylphosphine oxide derivatives, etc.

In one embodiment, the aliphatic long-chain maleimide compound has at least one maleimide group bonded with a substituted or unsubstituted long-chain aliphatic group. The long-chain aliphatic group is a $C_5$ to $C_{50}$ aliphatic group, such as $C_{10}$ to $C_{50}$, $C_{20}$ to $C_{50}$, $C_{30}$ to $C_{50}$, $C_{20}$ to $C_{40}$ or $C_{30}$ to $C_{40}$, but not limited thereto.

In some embodiments, the aliphatic long-chain maleimide compound may comprise a structure represented by Formula (VI) or Formula (VII), or a combination thereof:

Formula (VI)

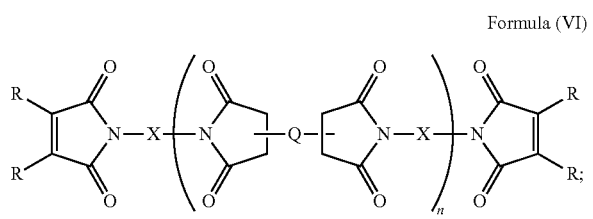

Formula (VII)

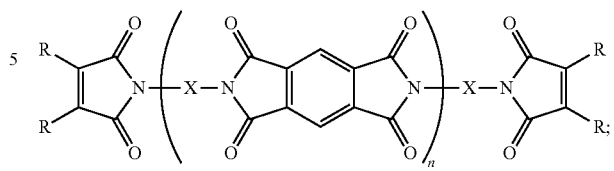

wherein X individually represents a substituted or unsubstituted aliphatic group, such as alkylene, alkenylene, or cycloalkylene; n is an integer of 1 to 10; Q represents a substituted or unsubstituted aliphatic group, aromatic group, heteroaromatic group, or siloxane group; and R individually represents hydrogen or a $C_1$ to $C_6$ hydrocarbyl, such as methyl, ethyl, propyl or the like.

In a preferred embodiment, the aliphatic long-chain maleimide compound may comprise a structure represented by Formula (VIII) or Formula (IX), or a combination thereof, and Formula (IX) is preferably represented by Formula (X):

Formula (VIII)

Formula (IX)

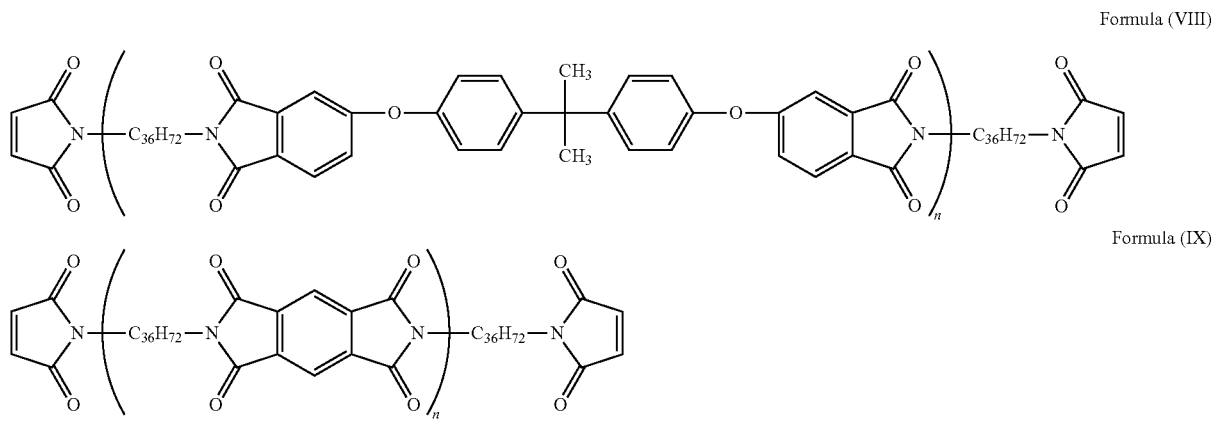

Formula (X)

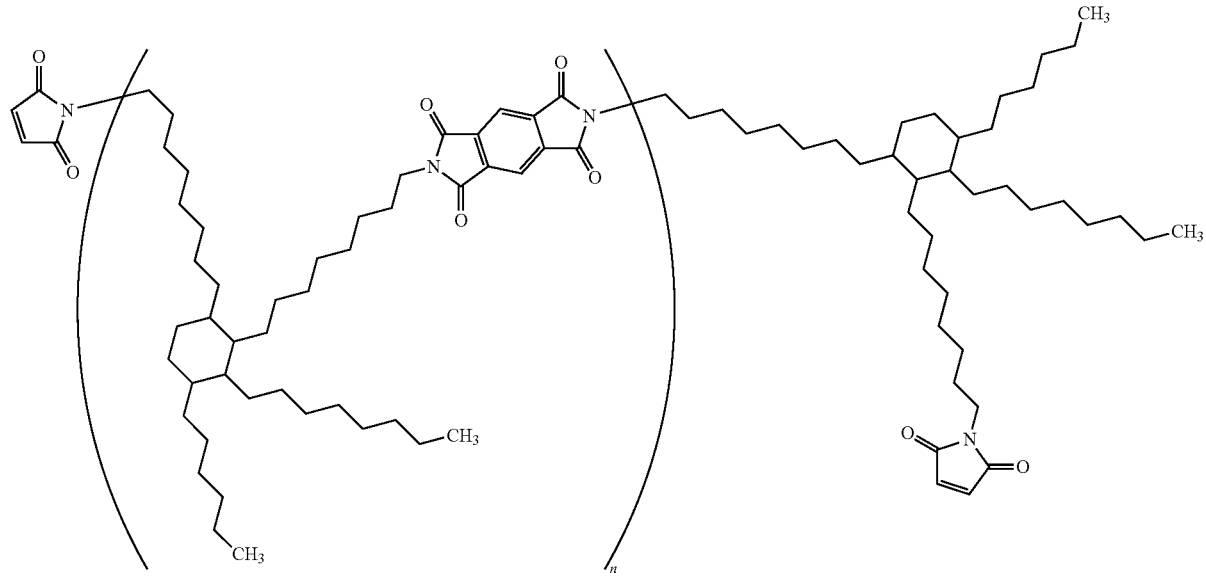

wherein n is an integer of 1 to 10.

In addition to the aforesaid two components, in various embodiments, the resin composition may optionally further comprise a vinyl compound, epoxy resin, cyanate ester resin, phenol curing agent, benzoxazine resin, styrene maleic anhydride resin, polyester, amine curing agent, polyamide, polyimide or a combination thereof.

For example, in some embodiments, the resin composition may comprise 5 to 55 parts by weight of the vinyl compound, such as 10 to 40 parts by weight.

In particular, the vinyl compound may comprise, but not limited to, conventional vinyl compounds used in the field to which this disclosure pertains, such as any one or a combination of divinylbenzene (DVB), bis(vinylbenzyl) ether (BVBE), 1,2-bis (vinylphenyl) ethane (BVPE), isocyanate ester, triallyl isocyanurate (TAIC), triallyl isocyanurate pre-polymer (pre-polymer TAIC), triallyl cyanurate (TAC), triallyl cyanurate prepolymer (pre-polymer TAC), 1,2,4-trivinyl cyclohexane (TVCH), vinyl benzyl maleimide (VBM), diallyl bisphenol A, styrene, acrylate (e.g., tricyclodecane di(meth)acrylate, tri(meth)acrylate), vinyl-terminated polyphenylene oxide resin (e.g., OPE-2st), maleimide, and polyolefin (e.g., styrene-butadiene copolymer, styrene-butadiene-divinylbenzene terpolymer, polybutene, etc.).

For example, in some embodiments, the resin composition may comprise 5 to 15 parts by weight of triallyl isocyanurate prepolymer, such as 10 to 15 parts by weight.

For example, in some embodiments, the resin composition may comprise 20 to 40 parts by weight of vinyl benzyl maleimide resin, such as 30 to 40 parts by weight.

The vinyl benzyl maleimide may have a structure represented by Formula (XI):

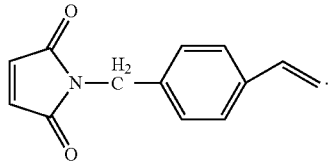

Formula (XI)

For example, the epoxy resin may be conventional epoxy resins known in the field to which this disclosure pertains, including but not limited to bisphenol A epoxy resin, bisphenol F epoxy resin, bisphenol S epoxy resin, bisphenol AD epoxy resin, phenol novolac epoxy resin, trifunctional epoxy resin, tetrafunctional epoxy resin, multifunctional epoxy resin, dicyclopentadiene (DCPD) epoxy resin, phosphorus-containing epoxy resin, DOPO (9,10-dihydro-9-oxa-10-phosphaphenanthrene-10-oxide) epoxy resin, DOPO-HQ epoxy resin, p-xylene epoxy resin, naphthalene epoxy resin (e.g., naphthol epoxy resin), benzofuran epoxy resin, isocyanate-modified epoxy resin, and phenol aralkyl novolac epoxy resin. The phenol novolac epoxy resin may be bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin, wherein the phosphorus-containing epoxy resin may be DOPO epoxy resin, DOPO-HQ epoxy resin or a combination thereof. The DOPO epoxy resin may be any one or more selected from DOPO-containing phenolic novolac epoxy resin, DOPO-containing cresol novolac epoxy resin and DOPO-containing bisphenol-A novolac epoxy resin; the DOPO-HQ epoxy resin may be any one or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin is not particularly limited and may be any commercial product or a combination thereof, such as a compound with an Ar—O—C≡N structure, wherein Ar represents an aromatic group, novolac, bisphenol A, bisphenol A novolac, bisphenol F, bisphenol F novolac or Phenolphthalein with or without substituent. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin or fluorene cyanate ester resin. The novolac cyanate ester resin may be bisphenol A novolac cyanate ester resin, bisphenol F novolac cyanate ester resin or a combination thereof.

For example, the cyanate ester resin may be available under the tradename Primaset PT-15, PT-30S, PT-60S, CT-90, BADCY, BA-100-10T, BA-200, BA-230S, BA-300S, BTP-2500, BTP-6020S, DT-4000, DT-7000, Methylcy, and ME-240S sold by Lonza.

For example, the phenol curing agent may be any phenol curing agent known in the field to which this disclosure pertains, including but not limited to dicyclopentadiene phenol resin, biphenyl phenol resin, tetrafunctional phenol resin, phenol novolac resin or a combination thereof.

For example, the benzoxazine resin includes, but not limited to, bisphenol A benzoxazine resin, bisphenol F benzoxazine resin, phenolphthalein benzoxazine resin, dicyclopentadiene benzoxazine resin, phosphorus-containing benzoxazine resin, such as LZ-8270, LZ-8280 or LZ-8290 sold by Huntsman or HFB-2006M sold by Showa High Polymer.

For example, the styrene maleic anhydride resin may include, but not limited to, styrene maleic anhydride copolymers such as SMA-1000, SMA-2000, SMA-3000, EF-30, EF-40, EF-60 and EF-80 sold by Cray Valley. Additionally, the styrene maleic anhydride resin may also be an esterified styrene maleic anhydride copolymer, such as esterified styrene maleic anhydride copolymers SMA1440, SMA17352, SMA2625, SMA3840 and SMA31890 sold by Cray Valley. The styrene maleic anhydride resin can be added individually or as a combination to the resin composition of this disclosure.

For example, the polyester may be prepared by esterification of dicarboxylic aromatic compounds with dihydroxy aromatic compounds, such as HPC-8000T65 sold by DIC Corporation.

For example, the amine curing agent may include, but not limited to, any one or a combination of diamino diphenyl sulfone, diamino diphenyl methane, diamino diphenyl ether, diamino diphenyl sulfide and dicyandiamide (DICY).

For example, the polyamide may be any polyamide known in the field to which this disclosure pertains, including but not limited to commercially available polyamide products.

For example, the polyimide may be any polyimide known in the field to which this disclosure pertains, including but not limited to commercially available polyimide products.

In addition, in various embodiments, the resin composition may further optionally comprise different additives, such as inorganic filler, curing accelerator, solvent, silane coupling agent, surfactant, toughening agent or a combination thereof.

For example, the inorganic filler may comprise, but not limited to, silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like and can be optionally pretreated by a silane coupling agent.

For example, the curing accelerator may comprise, but not limited to, a catalyst such as a Lewis base or a Lewis acid. The Lewis base includes imidazole, boron trifluoride amine complex, ethyltriphenyl phosphonium chloride, 2-methylimidazole, 2-phenyl-1H-imidazole, 2-ethyl-4-methylimidazole, triphenylphosphine, 4-dimethylaminopyridine or any combination thereof. The Lewis acid may comprise metal salt compounds, such as those of manganese, iron, cobalt, nickel, copper and zinc, such as zinc octanoate, cobalt octanoate, zinc acetylacetonate, and cobalt acetylacetonate as a metal catalyst. Alternatively, the curing accelerator may comprise a peroxide capable of producing free radicals, including but not limited to dicumyl peroxide, tert-butyl peroxybenzoate, 2,5-dimethyl-2,5-di(tert-butylperoxy)-3-hexyne, di(tert-butylperoxyisopropyl) benzene or any combination thereof.

For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethyl formamide, propylene glycol methyl ether, or a mixture thereof.

For example, the silane coupling agent may comprise, but not limited to, silane compounds and siloxane compounds.

Articles Made from Resin Composition

The resin compositions of various embodiments may be processed by various methods into different articles, including but not limited to a prepreg, a resin film, a resin film with copper foil, a laminate or a printed circuit board.

For example, the resin composition is useful for making a prepreg, by well mixing the resin composition to form a varnish, loading the varnish into an impregnation tank, impregnating a fiberglass fabric into the impregnation tank to adhere the resin composition onto the fiberglass fabric, and proceeding with heating and baking to a semi-cured state to obtain the prepreg.

The article made from the resin composition may also be a resin film, which is made by heating and baking the resin composition to a semi-cured state, such as by selectively coating the resin composition on a polyethylene terephthalate film (PET film), a polyimide film or a resin coated copper (RCC), followed by heating and baking to a semi-cured state to obtain the resin film.

In one embodiment for making the resin film with copper foil, the resin composition from each embodiment is coated on a copper foil to uniformly adhere the resin composition thereon, followed by heating and baking to a semi-cured state to obtain the resin film with copper foil.

Resin compositions of various embodiments of the present disclosure may also be made into a laminate, such as a copper-clad laminate, which comprises at least two metal foils and an insulation layer disposed between the metal foils, wherein the insulation layer is made by curing the resin composition at high temperature and high pressure, a suitable curing temperature being for example between 150° C. and 230° C. The insulation layer may be the aforesaid prepreg or resin film, and the metal foil may be copper, aluminum, nickel, platinum, silver, gold or alloy thereof, such as a copper foil.

For example, a double-sided copper-clad laminate (such as product name EM-827, available from Elite Material Co., Ltd.) with a thickness of 28 mil and having a 1 ounce (oz) HTE (high temperature elongation) copper foil may be provided and subject to hole-drilling and then electroplating, so as to form electrical conduction between the upper layer copper foil and the bottom layer copper foil to obtain a printed circuit board. Then etch the upper layer copper foil and the bottom layer copper foil to form inner layer circuits. Then perform brown oxidation and roughening on the inner layer circuits to form uneven structure on the surface to increase roughness. Next, a vacuum lamination apparatus is used to laminate the assembly of a copper foil, the prepreg, the inner layer circuits, the prepreg and a copper foil stacked in said order by heating at 190° C. to 220° C. for 90 to 180 minutes to cure the insulation material of the prepregs. Next, perform black oxidation, drilling, copper plating and other known circuit board processes on the outmost ultra-thin copper foil so as to obtain the printed circuit board.

The resin composition of the present disclosure and various articles made therefrom preferably have any one or a combination of the following properties:

(1) high formability of laminate, such as a resin content of 52% may be achieved for a prepreg made from a fiberglass fabric (e.g., 2116 fiberglass fabric); for example, an excellent formability of laminate may be achieved even if the resin composition does not contain a vinyl compound;

(2) high reliability of multiple laminations, such as no delamination occurs after 5 lamination processes (5 build-up cycles) when the laminate is subject to 20 times of reflow test by reference to IPC-TM-650 2.6.27, thereby being suitable for making multi-layer circuit boards;

(3) high chemical resistance, such as capable of preventing weave exposure (i.e., exposure of fiberglass fabric) after immersion in a NaOH solution; for example, it is capable of preventing weave exposure after 5-minute immersion in a NaOH solution, such as after an immersion time of up to 5 minutes, 10 minutes, or 15 minutes or greater, such as 20 minutes, 30 minutes, or 40 minutes;

(4) high storage modulus as measured by reference to IPC-TM-650 2.4.24.4, such as a storage modulus of between 6000 MPa and 9500 MPa, such as between 6500 MPa and 9500 MPa, between 7500 MPa and 9500 MPa, or between 8000 MPa and 9500 MPa;

(5) high interlayer bonding strength, such as the plurality of inner insulation layers have an interlayer bonding strength of between 2.9 lb/in and 4.0 lb/in as measured by reference to IPC-TM-650 2.4.8, such as between 3.0 lb/in and 4.0 lb/in, between 3.2 lb/in and 4.0 lb/in, or between 3.5 lb/in and 4.0 lb/in;

(6) high T288 thermal resistance as measured by reference to IPC-TM-650 2.4.24.1, such as no delamination after 70 minutes or longer;

(7) high soldering resistance as measured by reference to IPC-TM-650 2.4.23 such as greater than or equal to 20 times;

(8) high thermal resistance after moisture absorption as measured by reference to IPC-TM-650 2.6.16.1 and IPC-TM-650 2.4.23 such as greater than or equal to 3 hours;

(9) low dielectric constant as measured by reference to JIS C2565 at 10 GHz frequency, such as less than or equal to 3.3, such as between 2.7 and 3.3, between 2.9 and 3.3, or between 3.1 and 3.3; and

(10) low dissipation factor as measured by reference to JIS C2565 at 10 GHz frequency, such as less than or equal to 0.0035, such as between 0.0018 and 0.0035, between 0.0022 and 0.0035, or between 0.0025 and 0.0035.

Raw materials below were used to prepare the resins compositions of various Examples and Comparative Examples of the present disclosure according to the amount listed in Table 1 to Table 4 and further fabricated to prepare test samples or articles.

OPE-2st: vinylbenzyl-terminated polyphenylene ether resin, commercially available from Mitsubishi Gas Chemical Co., Inc.;

BVPE: 1,2-bis(p-vinylphenyl) ethane, commercially available from Linchuan Chemical Co., Ltd.;

VBM: vinyl benzyl maleimide, as shown below, synthesized by Applicant,

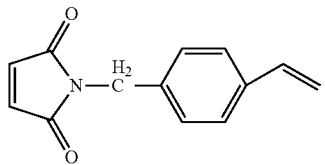

Formula (XI)

T-500: triallyl isocyanurate prepolymer (pre-polymer TAIC), commercially available from Chin Yee Chemical Co., Ltd.;

TAIC: triallyl isocyanurate, commercially available from Sigma Aldrich;

BMI-80: 2,2'-bis-[4-(4-maleimidephenoxy)phenyl]propane, commercially available from K.I Chemical Industry Co., Ltd.;

BMI-2300: phenylmethane maleimide oligomer, commercially available from Daiwa Fine Chemicals Co., Ltd.;

BMI-70: bis-(3-ethyl-5-methyl-4-maleimidephenyl) methane, commercially available from K.I Chemical Industry Co., Ltd.;

aliphatic long-chain maleimide 1: Formula (X), synthesized by Applicant;

aliphatic long-chain maleimide 2: Formula (VIII), synthesized by Applicant;

DOPO derivative with two DOPO groups: Formula (IV), as illustrated in Preparation Example 1;

DOPO derivative with three DOPO groups: Formula (V), as illustrated in Preparation Example 2;

PX-200: resorcinol dixylenylphosphate, commercially available from Daihachi Chemical Industry Co., Ltd.;

OP-935: aluminum salt of diethylphosphinic acid, commercially available from Clariant;

XZ92741: DOPO hydroxyl novolac flame retardant, commercially available from Dow Chemical Company;

SPV-100: vinyl phosphazene flame retardant, commercially available from Otsuka Chemical Co., Ltd.;

SPB-100: phosphazene flame retardant, commercially available from Otsuka Chemical Co., Ltd.;

25B: 2,5-dimethyl-2,5-di(t-butylperoxy)hexyne-3, commercially available from NOF Corporation;

SC-2500: spherical silica, commercially available from Admatechs;

toluene: commercially available from Chambeco Group.

Preparation Example 1

2 moles (432 g) of DOPO (9,10-dihydro-9-oxa-10-phosphaphenantrene-10-oxide), 1 mole (128 g) of 1,4-xylylene dichloride and 2400 g of dichlorobenzene solvent were added to a stirred tank, heated to 150° C. and stirred to dissolve solid contents to form a well-mixed homogeneous solution, followed by heating and stirring to carry out the reaction for 24 hours.

Next, the solution was cooled to room temperature, washed with hexane and filtered to obtain a white crystal product, which was dried under 120° C. for 6 hours and then ground to a particle size D50 of 6 μm (i.e., particles with size of less than 6 μm account for 50 vol %), so as to obtain a DOPO derivative with two DOPO groups, as represented by Formula (IV).

Preparation Example 2

3.5 moles (726 g) of DOPO (9,10-dihydro-9-oxa-10-phosphaphenantrene-10-oxide), 1 mole (266 g, Mn=265.61) of 1,3,5-trimethyl-2,4,6-tris(chloromethyl)benzene and 2400 g of toluene solvent were added to a stirred tank, heated to 150° C. and stirred to dissolve solid contents to form a well-mixed homogeneous solution, followed by heating and stirring to carry out the reaction for 24 hours.

Next, the solution was cooled to room temperature, washed with hexane and filtered to obtain a white crystal product, which was dried under 120° C. for 6 hours and then ground to a particle size D50 of 6 μm (i.e., particles with size of less than 6 μm account for 50 vol %), so as to obtain a DOPO derivative with three DOPO groups, as represented by Formula (V).

TABLE 1

Resin compositions of Examples (in part by weight) and test results

|  | Component | Model number | E1 | E2 | E3 | E4 | E5 | E6 | E7 |
|---|---|---|---|---|---|---|---|---|---|
| vinyl compound | vinylbenzyl-terminated polyphenylene ether resin | OPE-2st |  |  |  |  |  |  | 30 |
|  | 1,2-bis(vinylphenyl) ethane | BVPE |  |  |  |  |  |  |  |
|  | vinyl benzyl maleimide | VBM |  | 20 | 30 | 40 | 20 |  |  |
|  | triallyl isocyanurate prepolymer | T-500 | 10 | 10 | 10 | 10 | 10 | 5 |  |
|  | triallyl isocyanurate | TAIC |  |  |  |  |  |  |  |
| maleimide compound | 2,2'-bis[4-(4-maleimidephenoxy)phenyl]propane | BMI-80 |  |  |  |  |  |  |  |
|  | phenylmethane maleimide oligomer | BMI-2300 |  |  |  |  |  |  |  |
|  | bis-(3-ethyl-5-methyl-4-maleimidephenyl) methane | BMI-70 |  |  |  |  |  |  |  |
|  | aliphatic long-chain maleimide 1 | Formula (X) | 100 | 100 | 100 | 100 | 100 |  |  |
|  | aliphatic long-chain maleimide 2 | Formula (VIII) |  |  |  |  |  | 100 | 70 |

TABLE 1-continued

Resin compositions of Examples (in part by weight) and test results

| | | | | | | | | | |
|---|---|---|---|---|---|---|---|---|---|
| flame retardant | DOPO derivative with two DOPO groups | Formula (IV) | 55 | 55 | 55 | 55 | | 60 | 65 |
| | DOPO derivative with three DOPO groups | Formula (V) | | | | | 55 | | |
| | resorcinol dixylenylphosphate | PX-200 | | | | | | | |
| | aluminum phosphate | OP-935 | | | | | | | |
| | DOPO hydroxyl novolac flame retardant | XZ-92741 | | | | | | | |
| | vinyl phosphazene flame retardant | SPV-100 | | | | | | | |
| | phosphazene flame retardant | SPB-100 | | | | | | | |
| peroxide | 2,5-dimethyl-2,5-di(t-butylperoxy)hexyne-3 | 25B | 1 | 1 | 1 | 1 | 1 | 1 | 1 |
| inorganic filler | spherical silica | SC-2500 | 50 | 50 | 50 | 50 | 50 | 50 | 50 |
| solvent | toluene | | 100 | 100 | 100 | 100 | 100 | 100 | 100 |

| Property | Test item (method) | unit | E1 | E2 | E3 | E4 | E5 | E6 | E7 |
|---|---|---|---|---|---|---|---|---|---|
| PP formability | Resin content | % | 52 | 52 | 52 | 52 | 52 | 52 | 52 |
| reliability of multiple laminations | test of multiple laminations and multiple reflows | times | 5 | 5 | 5 | 5 | 5 | 5 | 5 |
| chemical resistance | no weave exposure by visual inspection (alkaline immersion time) | minutes | >15 | >15 | >15 | >15 | >15 | 10 | 5 |
| 288° C. thermal resistance | T288 (thermomechanical analyzer) | minutes | >70 | >70 | >70 | >70 | >70 | >70 | >70 |
| soldering resistance | S/D | cycles | >20 | >20 | >20 | >20 | >20 | >20 | >20 |
| thermal resistance after moisture absorption | pressure cooking test (3 hours) | NA | pass | pass | pass | pass | pass | pass | pass |
| dielectric constant | dielectric constant at 10 GHz | NA | 2.78 | 2.89 | 3.01 | 3.23 | 2.75 | 2.95 | 3.05 |
| dissipation factor | dissipation factor at 10 GHz | NA | 0.0022 | 0.0024 | 0.0028 | 0.0035 | 0.0024 | 0.0022 | 0.0024 |
| interlayer bonding strength | bonding strength between layers | lb/in | 3.66 | 3.56 | 3.34 | 3.21 | 3.59 | 3.37 | 3.04 |
| storage modulus | thermomechanical analyzer | MPa | 5100 | 6150 | 8232 | 9025 | 6150 | 5500 | 5621 |

TABLE 2

Resin compositions of Examples (in part by weight) and test results

| | Component | Model number | E8 | E9 | E10 | E11 | E12 | E13 |
|---|---|---|---|---|---|---|---|---|
| vinyl compound | vinylbenzyl-terminated polyphenylene ether resin | OPE-2st | 30 | | 30 | 30 | | 30 |
| | 1,2-bis(vinylphenyl) ethane | BVPE | | 30 | | | | |
| | vinyl benzyl maleimide | VBM | | | 10 | 10 | | |
| | triallyl isocyanurate prepolymer | T-500 | 15 | | 15 | 15 | | 25 |
| | triallyl isocyanurate | TAIC | | | | | 10 | |
| maleimide compound | 2,2'-bis[4-(4-maleimidephenoxy)phenyl]propane | BMI-80 | | | | | | |
| | phenylmethane maleimide oligomer | BMI-2300 | | | | | | |
| | bis-(3-ethyl-5-methyl-4-maleimidephenyl) methane | BMI-70 | | | | | | |
| | aliphatic long-chain maleimide 1 | Formula (X) | 70 | 70 | 60 | 60 | 100 | 70 |
| | aliphatic long-chain maleimide 2 | Formula (VIII) | | | | | | |
| flame retardant | DOPO derivative with two DOPO groups | Formula (IV) | 65 | 60 | 60 | | 55 | 65 |
| | DOPO derivative with three DOPO groups | Formula (V) | | | | 60 | | |
| | resorcinol dixylenylphosphate | PX-200 | | | | | | |
| | aluminum phosphate | OP-935 | | | | | | |
| | DOPO hydroxyl novolac flame retardant | XZ-92741 | | | | | | |
| | vinyl phosphazene flame retardant | SPV-100 | | | | | | |
| | phosphazene flame retardant | SPB-100 | | | | | | |
| peroxide | 2,5-dimethyl-2,5-di(t-butylperoxy)hexyne-3 | 25B | 1 | 1 | 1 | 1 | 1 | 1 |
| inorganic filler | spherical silica | SC-2500 | 50 | 50 | 50 | 50 | 50 | 50 |
| solvent | toluene | | 100 | 100 | 100 | 100 | 100 | 100 |

| Property | Test item (method) | unit | E8 | E9 | E10 | E11 | E12 | E13 |
|---|---|---|---|---|---|---|---|---|
| PP formability | Resin content | % | 52 | 52 | 52 | 52 | 52 | 52 |
| reliability of multiple laminations | test of multiple laminations and multiple times reflows | | 5 | 5 | 5 | 5 | 5 | 5 |

TABLE 2-continued

Resin compositions of Examples (in part by weight) and test results

| | | | | | | | | |
|---|---|---|---|---|---|---|---|---|
| chemical resistance | no weave exposure by visual inspection (alkaline immersion time) | minutes | >15 | 5 | >15 | >15 | 5 | >15 |
| 288° C. thermal resistance | T288 (thermomechanical analyzer) | minutes | >70 | >70 | >70 | >70 | >70 | 60 |
| soldering resistance | S/D | cycles | >20 | >20 | >20 | >20 | >20 | 15 |
| thermal resistance after moisture absorption | pressure cooking test (3 hours) | NA | pass | pass | pass | pass | pass | fail |
| dielectric constant | dielectric constant at 10 GHz | NA | 2.96 | 2.75 | 2.81 | 2.75 | 2.88 | 3.45 |
| dissipation factor | dissipation factor at 10 GHz | NA | 0.0021 | 0.0021 | 0.0021 | 0.0019 | 0.0028 | 0.0037 |
| interlayer bonding strength | bonding strength between layers | lb/in | 3.67 | 3.05 | 3.64 | 3.87 | 3.26 | 3.01 |
| storage modulus | thermomechanical analyzer | MPa | 5219 | 5935 | 7121 | 7500 | 4276 | not measured |

TABLE 3

Resin compositions of Comparative Examples (in part by weight) and test results

| | Component | Model number | C1 | C2 | C3 | C4 | C5 | C6 | C7 |
|---|---|---|---|---|---|---|---|---|---|
| vinyl compound | vinylbenzyl-terminated polyphenylene ether resin | OPE-2st | | | | | | | 100 |
| | 1,2-bis(vinylphenyl) ethane | BVPE | | | | | | | |
| | vinyl benzyl maleimide | VBM | | | | 20 | 20 | 20 | |
| | triallyl isocyanurate prepolymer | T-500 | 10 | 10 | 10 | 10 | 10 | 10 | 10 |
| | triallyl isocyanurate | TAIC | | | | | | | |
| maleimide compound | 2,2'-bis[4-(4-maleimidephenoxy)phenyl]propane | BMI-80 | | | 100 | | 100 | | |
| | phenylmethane maleimide oligomer | BMI-2300 | | 100 | | | | 100 | |
| | bis-(3-ethyl-5-methyl-4-maleimidephenyl)methane | BMI-70 | 100 | | | 100 | | | |
| | aliphatic long-chain maleimide 1 | Formula (X) | | | | | | | |
| | aliphatic long-chain maleimide 2 | Formula (VIII) | | | | | | | |
| flame retardant | DOPO derivative with two DOPO groups | Formula (IV) | 55 | 55 | 55 | 55 | 55 | 55 | 55 |
| | DOPO derivative with three DOPO groups | Formula (V) | | | | | | | |
| | resorcinol dixylenylphosphate | PX-200 | | | | | | | |
| | aluminum phosphate | OP-935 | | | | | | | |
| | DOPO hydroxyl novolac flame retardant | XZ-92741 | | | | | | | |
| | vinyl phosphazene flame retardant | SPV-100 | | | | | | | |
| | phosphazene flame retardant | SPB-100 | | | | | | | |
| peroxide | 2,5-dimethyl-2,5-di(t-butylperoxy)hexyne-3 | 25B | 1 | 1 | 1 | 1 | 1 | 1 | 1 |
| inorganic filler | spherical silica | SC-2500 | 50 | 50 | 50 | 50 | 50 | 50 | 50 |
| solvent | toluene | | 100 | 100 | 100 | 100 | 100 | 100 | 100 |

| Property | Test item (method) | unit | C1 | C2 | C3 | C4 | C5 | C6 | C7 |
|---|---|---|---|---|---|---|---|---|---|
| PP formability | Resin content | % | <30 | <30 | <30 | 52 | 52 | 52 | 52 |
| reliability of multiple laminations | test of multiple laminations and multiple reflows | times | immeasurable | | | 3 | 3 | 3 | 3 |
| chemical resistance | no weave exposure by visual inspection (alkaline immersion time) | minutes | | | | 5 | 5 | 5 | 5 |
| 288° C. thermal resistance | T288 (thermomechanical analyzer) | minutes | | | | >70 | >70 | >70 | 30 |
| soldering resistance | S/D | cycles | | | | >20 | >20 | >20 | >20 |
| thermal resistance after moisture absorption | pressure cooking test (3 hours) | NA | | | | pass | pass | pass | pass |
| dielectric constant | dielectric constant at 10 GHz | NA | | | | 3.56 | 3.51 | 3.53 | 3.45 |
| dissipation factor | dissipation factor at 10 GHz | NA | | | | 0.0045 | 0.0051 | 0.0054 | 0.0035 |
| interlayer bonding strength | bonding strength between layers | lb/in | | | | 2.26 | 2.65 | 2.89 | 2.45 |

TABLE 4

Resin compositions of Comparative Examples (in part by weight) and test results

| | Component | Model number | C8 | C9 | C10 | C11 | C12 | C13 |
|---|---|---|---|---|---|---|---|---|
| vinyl compound | vinylbenzyl-terminated polyphenylene ether resin | OPE-2st | 30 | 30 | 30 | 30 | 30 | 30 |
| | 1,2-bis(vinylphenyl) ethane | BVPE | | | | | | |
| | vinyl benzyl maleimide | VBM | | | | | | |
| | triallyl isocyanurate prepolymer | T-500 | 15 | 15 | 15 | 15 | 15 | 15 |
| | triallyl isocyanurate | TAIC | | | | | | |
| maleimide compound | 2,2'-bis[4-(4-maleimidephenoxy)phenyl] propane | BMI-80 | | | | | | |
| | phenylmethane maleimide oligomer | BMI-2300 | | | | | | 70 |
| | bis-(3-ethyl-5-methyl-4-maleimidephenyl) methane | BMI-70 | | | | | | |
| | aliphatic long-chain maleimide 1 | Formula (X) | 70 | 70 | 70 | 70 | 70 | |
| | aliphatic long-chain maleimide 2 | Formula (VIII) | | | | | | |
| flame retardant | DOPO derivative with two DOPO groups | Formula (IV) | | | | | | 65 |
| | DOPO derivative with three DOPO groups | Formula (V) | | | | | | |
| | resorcinol dixylenylphosphate | PX-200 | 65 | | | | | |
| | aluminum phosphate | OP-935 | | 65 | | | | |
| | DOPO hydroxyl novolac flame retardant | XZ-92741 | | | 65 | | | |
| | vinyl phosphazene flame retardant | SPV-100 | | | | 65 | | |
| | phosphazene flame retardant | SPB-100 | | | | | 65 | |
| peroxide | 2,5-dimethyl-2,5-di(t-butylperoxy)hexyne-3 | 25B | 1 | 1 | 1 | 1 | 1 | 1 |
| inorganic filler | spherical silica | SC-2500 | 50 | 50 | 50 | 50 | 50 | 50 |
| solvent | toluene | | 100 | 100 | 100 | 100 | 100 | 100 |

| Property | Test item (method) | unit | C8 | C9 | C10 | C11 | C12 | C13 |
|---|---|---|---|---|---|---|---|---|
| PP formability | Resin content | % | 52 | 52 | 52 | 52 | 52 | 52 |
| reliability of multiple laminations | test of multiple laminations and multiple reflows | times | 3 | 3 | 3 | 3 | 3 | 3 |
| chemical resistance | no weave exposure by visual inspection (alkaline immersion time) | minutes | 4 | 5 | 5 | 5 | 5 | 5 |
| 288° C. thermal resistance | T288 (thermomechanical analyzer) | minutes | 21 | 30 | 10 | 60 | >70 | >70 |
| soldering resistance | S/D | cycles | 15 | 15 | 5 | 19 | >20 | >20 |
| thermal resistance after moisture absorption | pressure cooking test (3 hours) | NA | fail | pass | pass | pass | pass | pass |
| dielectric constant | dielectric constant at 10 GHz | NA | 3.15 | 3.15 | 3.95 | 3.55 | 3.65 | 3.95 |
| dissipation factor | dissipation factor at 10 GHz | NA | 0.0039 | 0.0059 | 0.0079 | 0.0060 | 0.0069 | 0.0089 |
| interlayer bonding strength | bonding strength between layers | lb/in | 3.01 | 3.11 | 4.01 | 2.54 | 3.07 | 2.87 |

For the property tests listed in Table 1 to Table 4, samples (specimens) were prepared as described below and tested under specified conditions below.

1. Prepreg: Resin composition from each Example and each Comparative Example was separately well-mixed to form a varnish, which was then loaded to an impregnation tank; a fiberglass fabric (e.g., 1027 or 2116 E-glass fiber fabric or 1080 L-glass fiber fabric, available from Asahi) was impregnated into the impregnation tank to adhere the resin composition onto the fiberglass fabric, followed by heating and baking at 135° C. for 2 minutes to obtain a prepreg.

2. Copper-clad laminate (5-ply, formed by lamination of five prepregs): Two 18 μm HVLP (Hyper Very Low Profile) copper foils and five prepregs obtained from 2116 fiberglass fabrics impregnated with each Example or Comparative Example and having a resin content of about 52% were prepared and stacked in the order of copper foil, five prepregs and copper foil, followed by lamination under vacuum at 30 kgf/cm² pressure and 200° C. temperature for 2 hours to form a copper-clad laminate. Insulation layers were formed by laminating five sheets of prepreg between the two copper foils, and the resin content of the insulation layers is about 52%.

3. Copper-free laminate (5-ply, formed by lamination of five prepregs): Each aforesaid copper-clad laminate (5-ply) was etched to remove the two copper foils to obtain a copper-free laminate (5-ply) formed by laminating five sheets of prepreg and having a resin content of about 52%.

4. Copper-free laminate (2-ply, formed by lamination of two prepregs): Two 18 μm HVLP copper foils and two prepregs obtained from 1080 L-glass fabrics impregnated with each Example or Comparative Example and having a resin content of about 68% were prepared and stacked in the order of copper foil, two prepregs and copper foil, followed by lamination under vacuum at 200° C. temperature for 2 hours to form a two-layer copper-clad laminate. Then each copper-clad laminate obtained above was etched for removing the two copper foils so as to obtain the copper-free laminate (2-ply). Each insulation laminate was formed by laminating two prepregs, and the resin content thereof was about 68%.

Each specimen was analyzed as described below.

(1) PP Formability (Formability of Prepreg by Measurement of Resin Content):

Four 4 inch×4 inch 2116 fiberglass fabrics were prepared by using a punching machine and weighed to measure the weight as W1; similarly, four prepregs of the same size made from each specimen and fiberglass fabric (2116 E-fiberglass fabric) were prepared by using a punching machine and weighed to measure the weight as W2; the resin content (i.e., RC %) was calculated as RC %=[(W2−W1)/W2]×100%. If the resin content of the prepreg made from 2116 fiberglass fabric is 52%, it is determined as normal; if the resin content is less than 30%, it is determined that the resin is lack of sufficient adhesion and fails to be formed on the prepreg. With the control of roller gaps during the test, given that the same fiberglass fabric is used and the resin has good adhesion, the resin content can be controlled at a fixed value (i.e., 52%).

(2) Reliability of Multiple Laminations:

A core made by laminating a prepreg made from a 1078 fiberglass fabric and having traces on two surfaces was provided, subject to brown oxide treatment and provided on each of the two surfaces with a prepreg made from 1027 fiberglass fabric and a copper foil, and then subject to lamination and then formation of surface traces, so as to complete the first laminate. After that, the laminate thus obtained was subject to reflow process at 260° C. and tested by reference to IPC-TM-650 2.6.27 for twenty cycles. If the laminate did not show delamination (i.e., gaps were present between the cured resin and the fiberglass fabric or the cured resin and the fiberglass fabric were not finely adhered, as observed from the cross section of the specimen by visual inspection as well as by electron microscope), the laminate was again subject to brown oxide treatment and provided on each of the two surfaces with a prepreg made from 1027 fiberglass fabric and a copper foil and then subject to lamination, followed by formation of surface traces to complete the second laminate. After that, the laminate thus obtained was subject to reflow process at 260° C. and tested by reference to IPC-TM-650 2.6.27 for another twenty cycles. Delamination in the reflow test following increased number of laminations and formation of surface traces was observed to calculate the maximum number of laminations before delamination.

Five lamination processes may provide a 12-layer trace (i.e., 5+2+5 layers) laminate, indicating the resin composition is suitable for multiple laminations; if delamination occurs during three or less laminations, the trace layers of the laminate will be less than ten, indicating the resin composition is not suitable for multiple laminations.

(3) Chemical Resistance (Anti-NaOH):

A copper-clad laminate made by laminating eight prepregs made from 2116 fiberglass fabrics was etched to remove surface copper foil and then cut into 1 inch×1 inch copper-free samples; a 20 wt % NaOH solution was loaded into a container and heated to 90° C. for 5 minutes, followed by soaking the sample in the solution for several minutes and then withdrawn and washed with pure water to remove the residual NaOH solution on the surface. The sample was then dried under 90° C. for 5 minutes and scanned by a color scanner to produce an image file for visual inspection to determine whether weave exposure occurs (i.e., fiberglass fabric weaves can be observed by naked eyes); if there is no weave exposure, another sample from the same batch was then soaked for a longer time (unit: minute); if there is weave exposure, another sample from the same batch was then soaked for a shorter time (unit: minute). Chemical resistance can be evaluated from the recorded immersion time (unit: minute) to weave exposure; and longer immersion time to weave exposure indicates better chemical resistance.

(4) Thermal Resistance (T288):

The copper-containing laminate (obtained by laminating five prepregs) specimen was used in the T288 thermal resistance test. At a constant temperature of 288° C., a thermomechanical analyzer (TMA) was used by reference to IPC-TM-650 2.4.24.1 "Time to Delamination (TMA Method)" to measure each specimen and record the time to delamination.

(5) Soldering Resistance:

In soldering resistance test, by reference to IPC-TM-650 2.4.23, the copper-containing laminate (obtained by laminating five prepregs) specimen was soaked in a 288° C. solder bath for 10 seconds as one cycle, removed and placed under room temperature for about 10 seconds, and then soaked in the solder bath for 10 seconds, removed and placed under room temperature for about 10 seconds. The processes were repeated to measure the total cycles before the specimen occurs delamination. In general, greater number of total cycles before delamination in the soldering test indicates that the article made from the resin composition (e.g., copper-clad laminate) has better thermal resistance.

(6) Thermal Resistance after Moisture Absorption:

The copper-free laminate specimen with copper foil etched and removed (obtained by laminating five prepregs) was subject to the pressure cooking test (PCT, i.e., moisture absorption) by reference to IPC-TM-650 2.6.16.1 and IPC-TM-650 2.4.23 and then subject to the aforesaid soldering resistance test to determine whether delamination occurs after three hours of moisture absorption. Delamination was present if the specimen failed in the test.

(7) Dielectric Constant (Dk) and Dissipation Factor (Df):

In dielectric constant and dissipation factor measurement, the copper-free laminate (obtained by laminating two prepregs) was tested by using a microwave dielectrometer available from AET Corp. by reference to JIS C2565 "Measuring methods for ferrite cores for microwave device" at 10 GHz for analyzing each specimen. Lower dielectric constant and lower dissipation factor represent better dielectric properties of the specimen. A difference in Dk of greater than 0.05 represents a significant difference in dielectric constant in different laminates. A difference in Df of greater than 0.0005 represents a significant difference in dissipation factor in different laminates.

(8) Interlayer Bonding Strength:

The copper-clad laminate (5-ply) was cut into a rectangle with a width of 12.7 mm and a length of greater than 60 mm and tested by using a tensile strength tester by reference to IPC-TM-650 2.4.8 with the proviso that the surface copper foil was not etched off and the measurement position was set at the interface between the second prepreg and the third prepreg; under room temperature (about 25° C.), the cured insulation laminate was tested to measure the force (lb/in) required to separate the two layers. A difference in interlayer bonding strength of greater than 0.1 lb/in represents a significant difference.

(9) Storage Modulus:

The copper-free laminate specimen (5-ply) was tested by using dynamic mechanical analysis (DMA) by reference to IPC-TM-650 2.4.24.4 (unit: MPa); higher storage modulus represents higher laminate support and therefore higher pressure resistance without deformation.

The following observations can be made from Table 1 to Table 4.

First, comparing Example E1, which contains aliphatic long-chain maleimide, with Comparative Example C1 to C3, which contains a different maleimide, or comparing Example E2, which also contains aliphatic long-chain maleimide, with Comparative Example C4 to C6, which contains a different maleimide, it is found that E1 and E2 have better laminate formability, better reliability of multiple laminations, better chemical resistance, lower dielectric constant, lower dissipation factor and better interlayer bonding strength.

Comparing Example E8, which contains a flame retardant with two or more DOPO groups, with Comparative Example C8 to C12, which contains a different flame retardant, it is found that E8 demonstrates better reliability of multiple laminations, better chemical resistance, better thermal resistance, lower dielectric constant, lower dissipation factor and better interlayer bonding strength.

In addition, it is found that the addition of vinyl benzyl maleimide in Example E2 to E4 provides higher storage modulus and higher laminate support than Example E1.

Moreover, by analyzing the types of vinyl compound used in different examples, it is found that using triallyl isocyanurate prepolymer (E1), compared with using triallyl isocyanurate (E12), achieves lower dielectric constant, lower dissipation factor, better interlayer bonding strength and better storage modulus. On the other hand, by the comparison of Example E8 and E13, it is found that the amount of 5 to 15 parts by weight of triallyl isocyanurate prepolymer achieves better thermal resistance, dielectric constant, dissipation factor and interlayer bonding strength.

Overall, by comparing Example E1 to E13 with Comparative Example C1 to C13, it can be concluded that the resin composition of the present disclosure has achieved unexpected improvements on at least one of reliability of multiple laminations, chemical resistance, interlayer bonding strength, laminate formability and other properties.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A composition, comprising 55 to 65 parts by weight of a flame retardant and 60 to 100 parts by weight of an aliphatic long-chain maleimide compound, wherein the flame retardant comprises a compound with at least two 9,10-dihydro-9-oxa-10-phosphaphenanthrene-10-oxide (DOPO) groups, as shown by Formula (II) below:

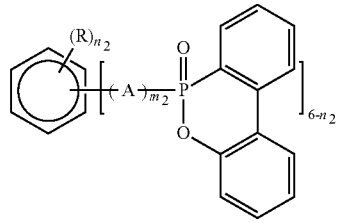

Formula (II)

in Formula (II), A represents a $C_1$ to $C_{10}$ straight chain or branched chain alkylene, m2 is an integer of 1 to 6, R represents hydrogen or a $C_1$ to $C_6$ hydrocarbyl, and n2 is an integer of 0 to 4;

wherein the aliphatic long-chain maleimide compound has at least one maleimide group bonded with a substituted or unsubstituted $C_5$ to $C_{50}$ aliphatic group, wherein the aliphatic long-chain maleimide compound comprises a structure represented by Formula (VI) or Formula (VII), or a combination thereof:

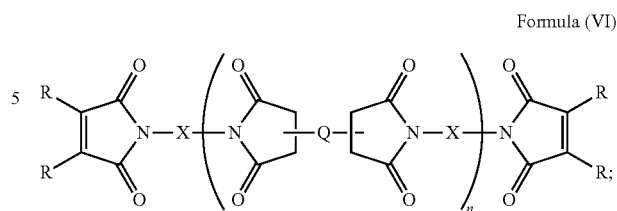

Formula (VI)

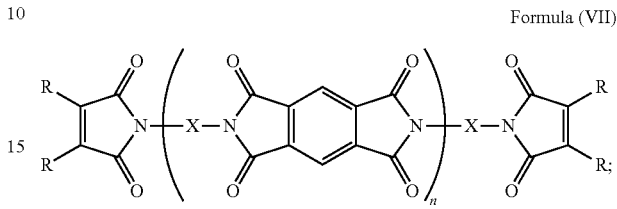

Formula (VII)

wherein X individually represents a substituted or unsubstituted aliphatic group, n is an integer of 1 to 10, Q represents a substituted or unsubstituted aliphatic group, aromatic group, heteroaromatic group, or siloxane group, and R individually represents hydrogen or a $C_1$ to $C_6$ hydrocarbyl.

2. The composition of claim 1, wherein the flame retardant comprises a structure represented by Formula (IV) or Formula (V), or a combination thereof:

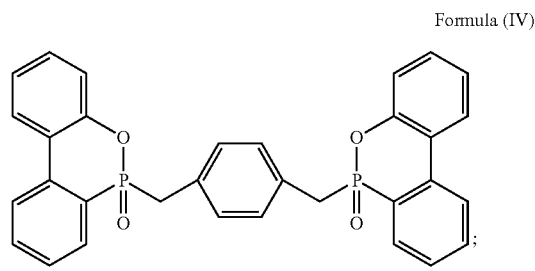

Formula (IV)

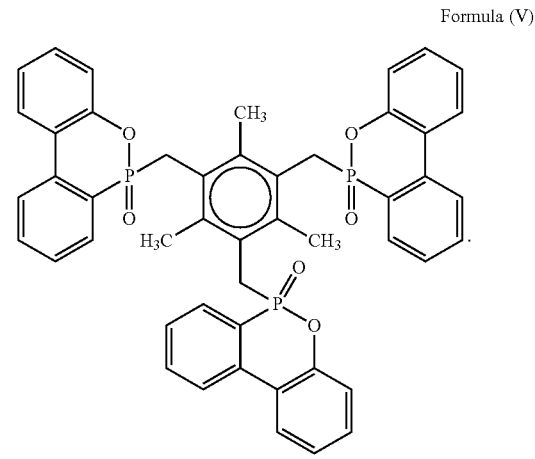

Formula (V)

3. The composition of claim 1, wherein the aliphatic long-chain maleimide compound comprises a structure represented by Formula (VIII) or Formula (IX), or a combination thereof:

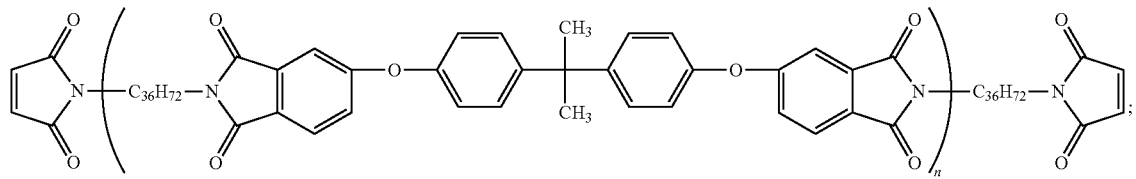

Formula (VIII)

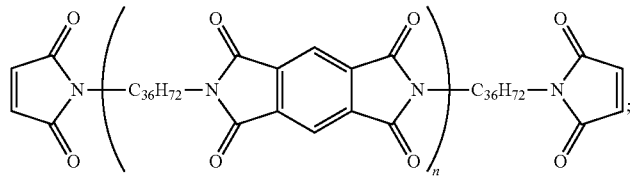

Formula (IX)

wherein n is an integer of 1 to 10.

4. The composition of claim 1, further comprising 5 to 55 parts by weight of a vinyl compound.

5. The composition of claim 1, further comprising 5 to 15 parts by weight of a triallyl isocyanurate prepolymer.

6. The composition of claim 1, further comprising 20 to 40 parts by weight of a vinyl benzyl maleimide resin.

7. An article made from the composition of claim 1, comprising a prepreg, a resin film, a resin film with copper foil, a laminate or a printed circuit board.

8. The article of claim 7, which is capable of sustaining 20 times of reflow test by reference to IPC-TM-650 2.6.27 after 5 lamination processes without delamination.

9. The article of claim 7, which is capable of preventing weave exposure after 5-minute immersion in a NaOH solution.

10. The article of claim 7, having a storage modulus of between 6000 MPa and 9500 MPa as measured by reference to IPC-TM-650 2.4.24.4.

11. The article of claim 7, comprising outer insulation layers and a plurality of inner insulation layers between the outer insulation layers, wherein the plurality of inner insulation layers have an interlayer bonding strength of between 2.9 lb/in and 4.0 lb/in as measured by reference to IPC-TM-650 2.4.8.

12. The article of claim 7, having at least one of the following properties:
a T288 thermal resistance as measured by reference to IPC-TM-650 2.4.24.1 of greater than or equal to 70 minutes;
a soldering resistance as measured by reference to IPC-TM-650 2.4.23 of greater than or equal to 20 times;
a thermal resistance after moisture absorption as measured by reference to IPC-TM-650 2.6.16.1 and IPC-TM-650 2.4.23 of greater than or equal to 3 hours;
a dielectric constant at 10 GHz as measured by reference to JIS C2565 of less than or equal to 3.3; and
a dissipation factor at 10 GHz as measured by reference to JIS C2565 of less than or equal to 0.0035.

* * * * *